United States Patent [19]

Gish

[11] Patent Number: 4,709,721

[45] Date of Patent: Dec. 1, 1987

[54] INTEGRAL BASE REFILL SYSTEM BALLCOCK ASSEMBLY

[75] Inventor: Larry D. Gish, Robards, Ky.

[73] Assignee: Johnson Service Company, Milwaukee, Wis.

[21] Appl. No.: 27,542

[22] Filed: Mar. 18, 1987

[51] Int. Cl.⁴ .................... F16K 31/20; F16K 33/00; F16K 47/02

[52] U.S. Cl. .................................. 137/437; 137/218; 137/441; 137/444; 137/451; 251/118

[58] Field of Search ............... 137/217, 218, 436, 437, 137/441, 444, 451; 251/46, 118

[56] References Cited

U.S. PATENT DOCUMENTS

| | | | |
|---|---|---|---|
| 2,302,274 | 11/1942 | Svirsky | 137/444 |
| 2,779,350 | 1/1957 | Owens | 137/436 |
| 2,791,235 | 5/1957 | Smith | 137/437 |
| 2,971,525 | 2/1961 | Antunez, Jr. | 137/444 |
| 2,989,071 | 6/1961 | Fulton et al. | 137/437 |
| 3,120,855 | 2/1964 | Fischer | 137/451 |
| 3,495,618 | 2/1970 | Iles | 137/437 |
| 3,556,132 | 1/1971 | Suffron et al. | 137/437 |
| 3,930,516 | 1/1976 | Flinner et al. | 137/436 |
| 3,994,313 | 11/1976 | Brandelli | 137/437 |

FOREIGN PATENT DOCUMENTS

| | | | |
|---|---|---|---|
| 238485 | 5/1962 | Australia | 137/437 |
| 568841 | 7/1958 | Belgium | 137/437 |

*Primary Examiner*—George L. Walton
*Attorney, Agent, or Firm*—Harness, Dickey & Pierce

[57] ABSTRACT

An improved ballcock assembly for a toilet water reservoir which provides quiet reservoir refill operation without requiring a conventional water discharge hush tube. Quiet refill operation is provided by discharging refill water through a plurality of openings which create individual streams of water which flow along the side surfaces of a standpipe having longitudinally extending external ridges or walls. The walls maintain the separation of the individual water streams which cascade down the standpipe surface. The outside surface of the standpipe is preferably tapered outwardly from top to bottom so that the water flows along a tapered surface which reinforces the cascading flow regime. The reduced flow for each stream and the cascading flow action combine to provide quiet refill operation. Since the ballcock assembly refill openings are above reservoir tank water level, water normally cannot be sucked through them and into the water supply system.

4 Claims, 3 Drawing Figures

INTEGRAL BASE REFILL SYSTEM BALLCOCK ASSEMBLY

BACKGROUND OF THE INVENTION

This invention relates to a fluid valve assembly and particularly to a ballcock assembly which regulates the flow of water into a toilet reservoir tank.

Ballcock assemblies regulate the flow of water into the reservoir rank of conventional toilets to fill the tank to a desired level. When the toilet is flushed, water drains from the reservoir tank which must thereafter be refilled. Ballcock assemblies control tank refilling and have a float which senses the water level in the tank and stops the flow once a desired level is reached.

Designers of ballcock assemblies have made numerous attempts at making their operation quieter during tank refilling when water under high line pressure is being discharged into the reservoir tank. Typically, a so-called "hush" tube is provided which extends from the ballcock valve downward to the bottom of the reservoir tank. Once water begins to enter the tank during refilling, the outlet of the hush tube is submersed below water level which reduces annoying water rushing sounds. Although hush tubes operate satisfactorily, their use complicates the ballcock assembly structure by requiring additional components.

For sanitary considerations, ballcock assemblies must be provided with a means for preventing the reverse flow of water from the toilet water reservoir into the water supply line. Typically, a vacuum break is provided within the ballcock valve to prevent water from flowing from the hush tube into the water supply line when a subatmospheric pressure exists in the supply line. Although such vacuum break systems operate satisfactorily, it is desirable to provide additional safeguards to prevent water backflow.

SUMMARY OF THE INVENTION

The above-described desirable features of a ballcock assembly are provided in accordance with this invention. The present ballcock assembly eliminates the need for a hush tube by providing a number of refill openings within the ballcock valve assembly from which streams of water are discharged. The ballcock standpipe is formed with projecting walls which form separated open channels extending downwardly along its outer surface. When streams of water are discharged from the ballcock valve assembly, they cascade along the surface of the standpipe within their individual channels. These inventors have found that such cascading of the individual streams substantially reduces refilling noise, thus avoiding the need for a hush tube. The deletion of the hush tube practically eliminates the likelihood that water can be siphoned in a reverse direction into the water supply line since the refill openings are above water level. Therefore, the ballcock assembly in accordance with this invention is inherently resistant to backflow without depending on a vacuum break system.

Additional benefits and advantages of the present invention will become apparent to those skilled in the art to which this invention relates from the subsequent description of the preferred embodiments and the appended claims taken in conjunction with the accompanying drawings.

DETAILED DESCRIPTION OF THE INVENTION

Figure 1:
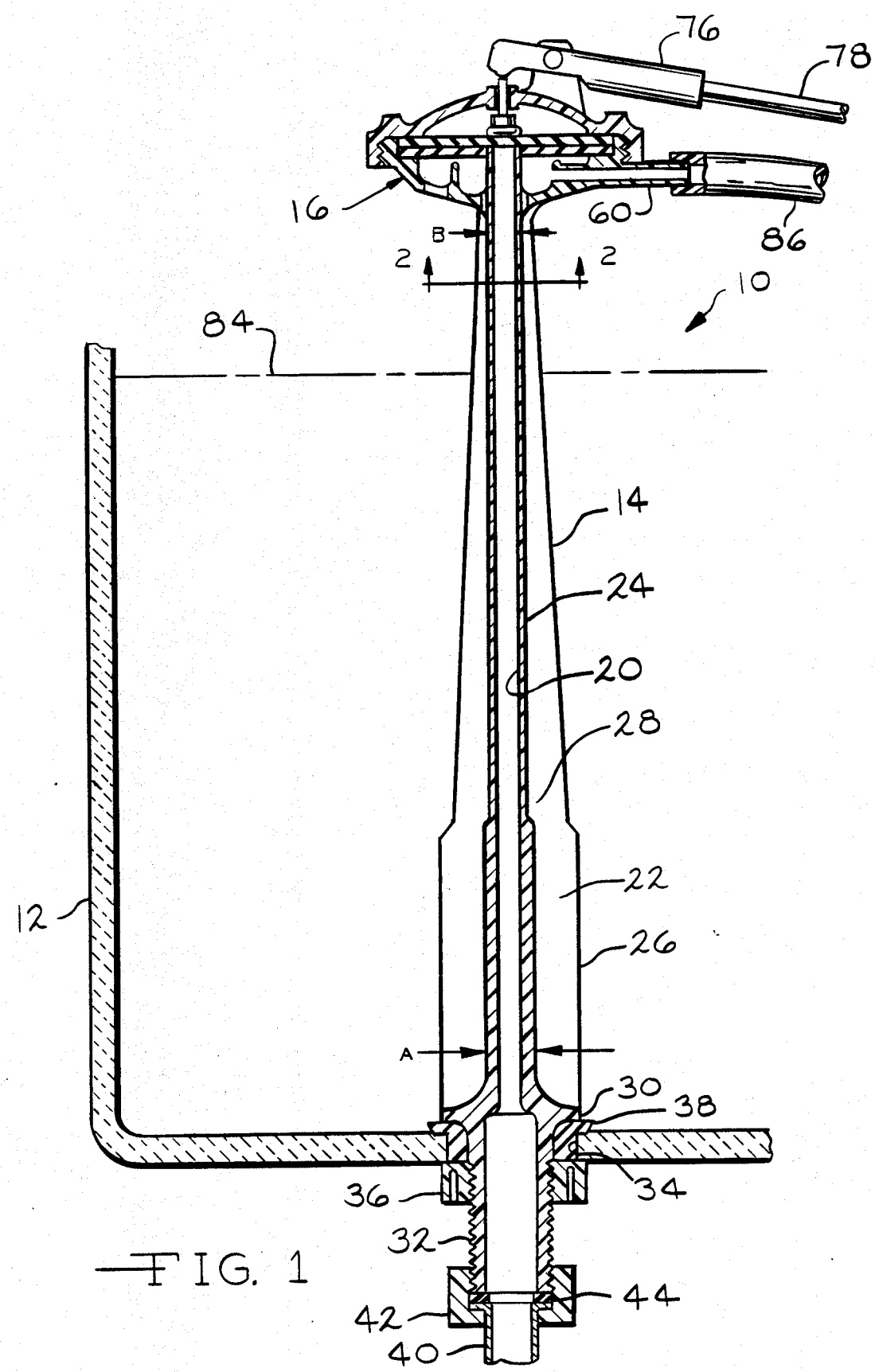
FIG. 1 is a cross-sectional view through a ballcock assembly according to this invention shown mounted within a toilet reservoir tank.

A ballcock assembly in accordance with the present invention is shown in each of the figures and is generally designated by reference number 10. Ballcock assembly 10 is adapted to be mounted within a toilet reservoir tank 12 as shown in FIG. 1 and controls the flow of water from a water supply line into the reservoir tank. Ballcock assembly 10 principally comprises standpipe 14 and ballcock valve assembly 16.

Standpipe 14 extends vertically within reservoir tank 12 and defines a central inlet duct 20 and has a plurality of external fins or walls 22 which project in a generally radially outward direction and extend longitudinally along the standpipe to define water flow channels 28. The external surface of standpipe 14 at the roots of walls 22, designated by reference number 24, is preferably slightly tapered from top to bottom such that the lowermost portion has a greater outside diameter than the uppermost portion, i.e. dimension A in FIG. 1 is greater than dimension B. Such tapering can be provided without difficulty since draft angles are ordinarily necessary when forming parts by injection molding which is the preferred manufacturing process for standpipe 14. The radially outer edge 26 of walls 22 are similarly tapered such that they are enlarged at the lower end of standpipe 14.

The lower end of standpipe 14 includes a radially outwardly extending mounting flange 30 and a threaded end 32 which extends through hole 34 within reservoir tank 12. Threaded nut 36 meshes with threaded end 32 and compresses gasket 38 against the inside surface of hole 34, thus providing a fluidtight connection. Supply line 40 is connected to threaded end 32 using fitting nut 42 which compresses gasket 44 providing a fluidtight connection.

Figure 2:
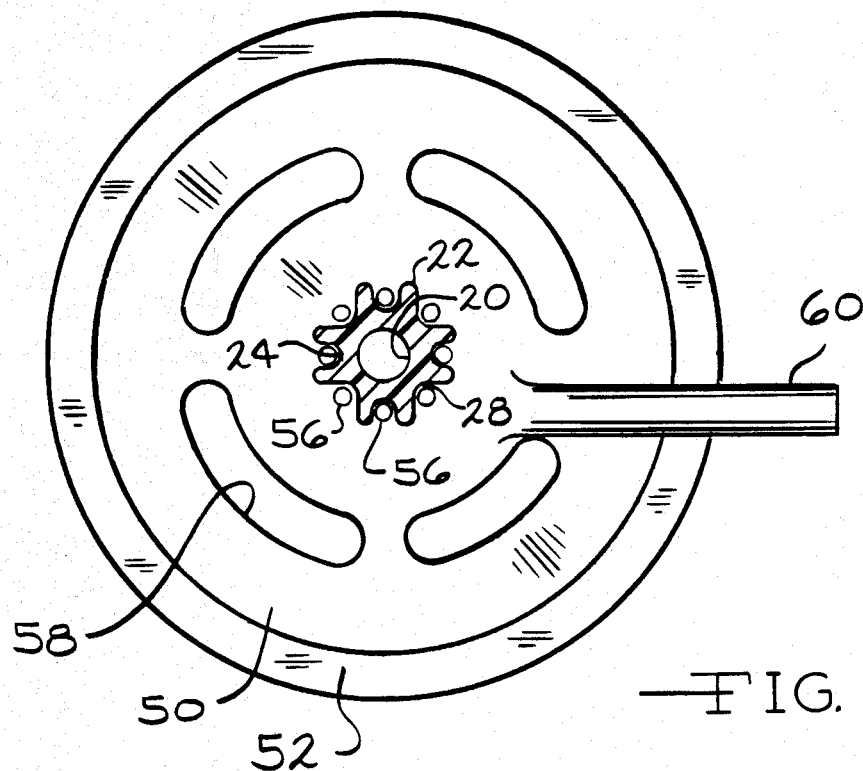
FIG. 2 is a cross-sectional view taken along line 2—2 of FIG. 1 particularly showing the refill openings and anti-siphon vents of the ballcock valve assembly.

Ballcock valve assembly 16 includes housing 50 which is generally bowl-shaped and has an outer flange 52. Standpipe 14 includes pipe portion 54 which extends upwardly into housing 50. As best shown in FIG. 2, housing 50 has a plurality of refill openings 56, each of which is separated from other refill openings by walls 22. For the embodiment shown herein, a total of eight refill openings 56 are provided which are separated by eight walls 22. Housing 50 further defines anti-siphon vents 58 and bowl fill tube connection 60. An upstanding circular wall 62 is formed within housing 50, as best shown in FIGS. 1 and 3.

Ballcock valve cover 66 is secured to housing 50 by corresponding threads on each member. A pair of diaphragms are compressed between cover 66 and housing 50. Flow control diaphragm 68 controls the discharge of water from pipe portion 54, as will be better explained below. Vacuum break diaphragm 70 has a central hole 72 which surrounds pipe portion 54. Cover 66 further includes float valve lever fulcrum 74. Ball float lever 76 is pinned for relative rotation about fulcrum 74. Lever rod 78 is affixed to lever 76 and is attached to a ball float (not shown) of conventional construction. The opposite end of lever 76 acts on valve pin 80, which acts on flow control diaphragm 68.

FIG. 1 illustrates the cooperation of components of ballcock assembly 10 when reservoir tank 12 is filled to a desired level with water. A filled water level, indicated by reference line 84, is normally present within reservoir tank 12. When water reaches the level of reference line 84, the float connected to lever rod 78 rises to the point where pin 80 is depressed against flow control diaphragm 68, which blocks the opening of pipe portion 54, thus preventing water from supply line 40 from filling reservoir tank 12.

Figure 3:
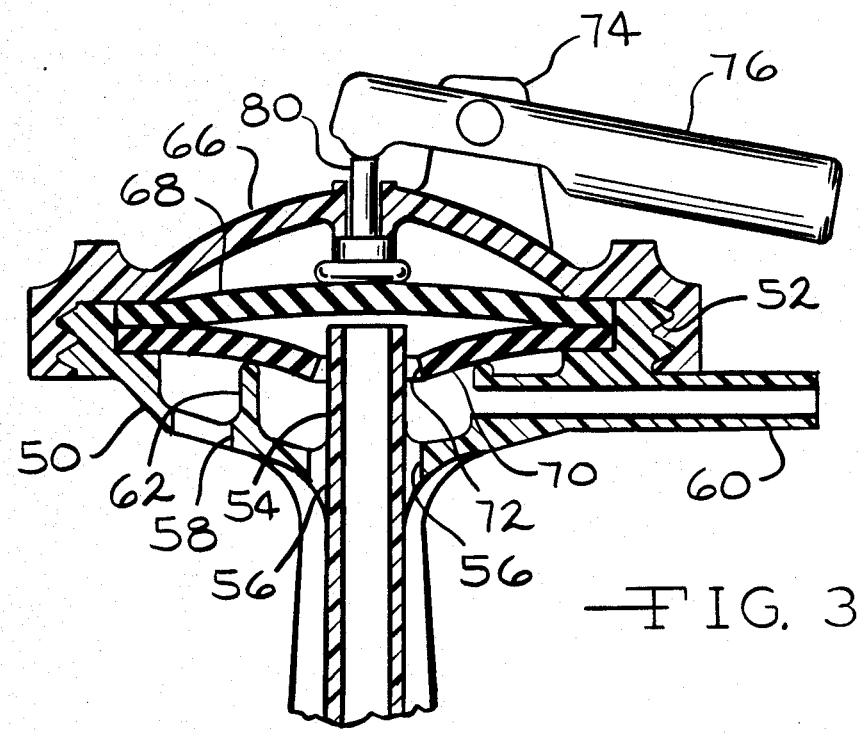
FIG. 3 is an enlarged partial cross-sectional view showing the ballcock valve assembly according to this invention in the refilling mode of operation.

FIG. 3 illustrates the cooperation of the components when the ballcock assembly 10 is admitting water into reservoir tank 12. In this mode, the float falls to the water level, enabling pin 80 to be lifted. Since the water supply pressure is greater than atmospheric, flow control diaphragm 68 is caused to unseat from pipe portion 54, thus allowing water to flow through inlet duct 20. Pressurized water from the supply line acts on vacuum break diaphragm 70, urging it to the deflected position shown in FIG. 3. In this position, diaphragm 70 seals against wall 62, and water flows through diaphragm center hole 72 and through refill openings 56.

Since there are a plurality of refill openings, the volume flow rate through each during tank refilling is significantly less than the total flow rate through inlet duct 20. The water discharged from refill openings 56 is directed against outside surface 24 and cascades within channels 28 along the surface of standpipe 14. As previously mentioned, the outside surface of standpipe 14 within channels 28 is preferably tapered to maintain the water flows in contact with its surface, thus enhancing the cascading flow regime. These inventors have found that such cascading action provides reduced refilling sound caused by discharge of the pressurized water. This cascading action, coupled with the reduced water flow rate through each of the refill openings, provides quiet refill operation without requiring a hush tube component in accordance with the teachings of the prior art.

As water is being discharged from refill openings 56 during tank refilling, water is also discharged through bowl fill tube connection 60 which is conducted through tube 86 to refill the toilet bowl in accordance with well-known prior art designs. Once the water level within reservoir tank 12 reaches reference level 86, pin 80 acts on diaphragm 68 to again seal against pipe portion 54, thereby stopping the flow of water through inlet duct 20. Additionally, vacuum break diaphragm 70 returns to the position shown in FIG. 1.

Housing 50 is vented by anti-siphon vents 58 to equalize the pressure within housing 50 at atmospheric. Although a vacuum break system is provided, the present ballcock assembly 10 is inherently resistant to backflow of water from reservoir tank 12 to supply line 40 since refill openings 56 open into the head space above the upper water level indicated by reference line 84.

While the above description constitutes the preferred embodiments of the present invention, it will be appreciated that the invention is susceptible to modification, variation and change without departing from the proper scope and fair meaning of the accompanying claims.

What is claimed is:

1. A ballcock assembly for controlling the flow of water from a supply line into a toilet reservoir tank comprising:

a standpipe having a central water inlet duct and a plurality of integral generally longitudinally outwardly extending external walls, said walls being tapered along the entire length of said standpipe, decreasing in width as they approach the refill openings, said standpipe adapted to extend vertically within said reservoir tank, and a ballcock valve assembly having means for sensing the level of water in said tank for stopping the flow of water into said reservoir tank when the level of water therein reaches a desired level, said ballcock valve assembly having a plurality of water refill openings, said refill openings being oriented such that they produce individual streams of water which are directed along said outside surface of said standpipe and are separated from each other by said walls to maintain the flow of water in contact with the standpipe external walls for producing a cascading flow action to reduce the refilling noise caused by the discharge of the flow of water from the refill openings.

2. The ballcock assembly according to claim 1 wherein said standpipe outside surface is tapered such that its cross-sectional diameter at the bottom of said standpipe is greater than its cross-sectional diameter at the top of said standpipe whereby said streams flow along tapered surfaces.

3. A ballcock assembly for controlling the flow of water from a supply line into a toilet reservoir tank comprising:

a ballcock valve assembly including:
a bowl-shaped housing having an outer flange, a central water discharge pipe, vent outlets, an upstanding wall positioned radially between said central discharge pipe and said vent outlets, a bowl fill tube connection communicating with the interior of said housing adjacent said pipe, and a plurality of refill openings encircling said water discharge pipe,
a cover enclosing said housing,
a first flexible diaphragm disposed between said cover and said housing and covering said water discharge pipe, said first diaphragm adapted to control the flow of water from said water discharge pipe,
a second flexible diaphragm disposed between said cover and said housing and having a central hole surrounding said water discharge pipe, said second diaphragm engageable with said upstanding wall,
a ball float lever coupled to said first diaphragm wherein when the water level in said reservoir is below a reference level, water is permitted to deflect said first diaphragm to flow from said discharge pipe and deflects said second diaphragm causing said second diaphragm to seal against said wall wherein water is discharged through said refill openings and said bowl fill tube connection, and wherein said second diaphragm and said vent outlets operate as a vacuum break when the pressure in said water supply pipe is below atmospheric, said lever acting on said first diaphragm to seal against said water discharge pipe when the water reaches said reference level, and a standpipe having a central water inlet duct and a plurality of integral generally longitudinally outwardly extending exteral walls, said walls being tapered along the entire length of said standpipe, decreasing in width as they approach the refill openings and terminating on opposite sides of the refill openings, said standpipe adapted to extend vertically within said reservoir tank, said refill openings being oriented such that they produce individual streams of water which are directed along said outside surface of said standpipe and are separated from each other by said walls to maintain the flow of water in contact with the standpipe external walls for producing a cascading flow action to reduce the refilling noise caused by the discharge of the flow of water from the refill openings.

4. The ballcock assembly according to claim 3 wherein said standpipe outside surface is tapered such that its cross-sectional diameter at the bottom of said standpipe is greater than its cross-sectional diameter at the top of said standpipe whereby said streams flow along tapered surfaces.

* * * * *